United States Patent [19]
Jahn

[11] Patent Number: 5,958,608
[45] Date of Patent: Sep. 28, 1999

[54] FRICTION SYSTEM

[75] Inventor: Wolfgang Jahn, Peiting, Germany

[73] Assignee: Hoerbiger Antriebstechnik GmbH, Germany

[21] Appl. No.: 08/821,310

[22] Filed: Mar. 20, 1997

[30] Foreign Application Priority Data

Mar. 25, 1996 [AU] Australia ................... A 535/96

[51] Int. Cl.⁶ ................................................. B32B 15/00
[52] U.S. Cl. ...................... 428/688; 428/698; 428/702
[58] Field of Search ............................ 428/688, 689, 428/698, 699, 702, 704

[56] References Cited

U.S. PATENT DOCUMENTS

| | | | |
|---|---|---|---|
| 4,287,975 | 9/1981 | Tuzson | 192/43 |
| 5,109,966 | 5/1992 | Mukai et al. | 192/70.12 |
| 5,538,649 | 7/1996 | Demendi et al. | 508/101 |
| 5,558,186 | 9/1996 | Hyde et al. | 188/218 XL |
| 5,585,166 | 12/1996 | Kearsey | 428/212 |

*Primary Examiner*—Elizabeth Evans
*Attorney, Agent, or Firm*—Watson Cole Grindle Watson, P.L.L.C.

[57] ABSTRACT

A friction system moistened by a lubricating oil comprising a pair of friction bodies movable relative to each other along a friction surface. At least one of the friction bodies contains a friction lining having a heat capacity ratio and a heat conductivity ratio which diminish perpendicularly away from the friction surface such that boundary friction and thermal elimination of the lubricating oil ensue at individual friction points of the friction surface, thereby disposing the seizing tendency of the friction bodies and obtaining constant coefficients of friction and low rates of wear.

19 Claims, 1 Drawing Sheet

FRICTION SYSTEM

BACKGROUND OF THE INVENTION

1. Field of the Invention

The invention relates to a friction system having a pair of friction bodies which are movable relative to each other, and in which at least one of the friction bodies has a friction lining. More specifically, the friction bodies of the friction system frictionally engage one another at a fluid or lubricant cooled interface in order to transmit a torque.

2. Description of the Prior Art

A conventional wet-running friction system generally has friction pairing such as plates, disks, drums, cones, and synchronizing rings. One side of the friction pairing may be coated with a friction lining to obtain a high or stable coefficient of friction with a lowest possible rate of wear. The friction lining, which may be a sintered friction lining grooved and sized on a support element, or an organic friction lining glued on a support element, is chosen in accordance with the given condition of use.

One of the disadvantages of the aforementioned conventional friction system is that the coefficients of friction and wear rate are very dependent on the specific load, the friction elements, and the type of lubricating oil used. For example, the aforementioned organic friction lining would fail under high contact pressure, or produce so-called "hot spots" under high load with inadequate cooling condition. Moreover, depending on the type of lubricating oil used, the aforementioned sintered friction lining can produce a sinter transfer onto the mating surface when the system is subjected to a high speed and inadequate low cooling condition, and sinter linings cause vibration in low surface pressure systems. These problems can cause the friction system and/or the subassembly equipped with it (e.g., a clutch, a brake, or a synchronizing device) to fail.

SUMMARY OF THE INVENTION

It is, therefore, an object of the invention to overcome the aforementioned prior art problems by providing a friction system which produces a constant, oil-independent coefficient of friction in a wide load range with very low rates of wear.

The forgoing object is achieved according to the present invention by a friction system comprising at least two friction bodies movable relative to, and frictionally engaging with, each other at a fluid or lubricant cooled interface in order to transfer torque oil to transmit power, wherein one of the friction bodies has a friction lining in which the ratio of heat capacity and heat conductivity diminish perpendicularly away from the friction surface to cause contact friction by thermally eliminating the lubricating oil at individual friction points of said friction surface, and to eliminate seizing tendency of the friction bodies.

Other features and advantages of the invention will become apparent upon reference to the following Description of the Preferred Embodiment, with its attached drawing.

DESCRIPTION OF THE PREFERRED EMBODIMENT

Figure 1:
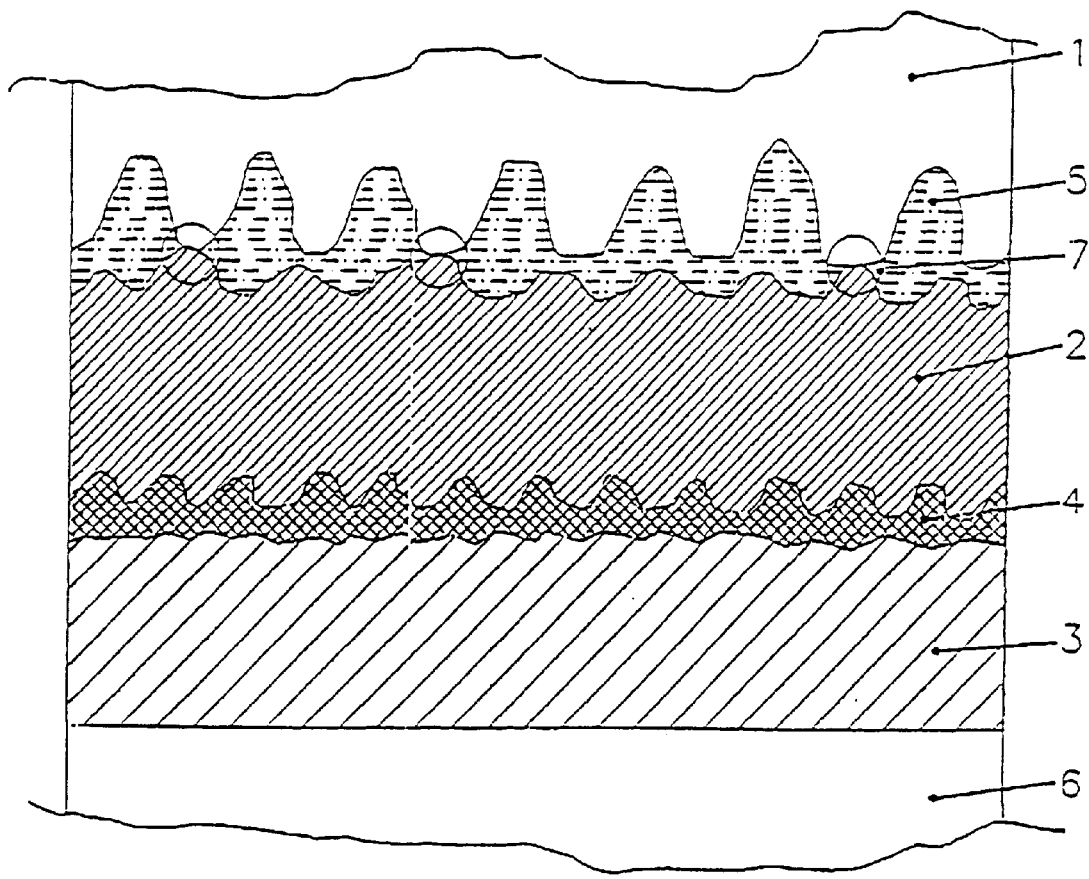
FIG. 1 is a cross-sectional view of a friction pairing according to the embodiment of this invention.

In FIG. 1, an exemplary embodiment of the present invention is shown. One of the friction elements of the friction system is a mating element 1 (e.g., a brake drum) made of a tempered steel. The other friction element of the friction pairing is a surface coating that forms a friction layer 2 having a relatively low heat conductivity. Beneath the friction layer 2 is a heat conducting layer 3 made of a copper-rich matrix having a relatively high heat conductivity. In between the friction layer 2 and the heat conducting layer 3 resides a bonding layer 4 about 0.02 mm thick. The connecting layer 4 ensures a high degree of adhesive strength between the friction layer 2 and the heat conducting layer 3 by allowing components of the friction layer 2 to penetrate pores of the heat conducting layer 3 during coating. The friction layer 2, conducting layer 3, and core plate connecting layer 4 form a friction lining for one of the friction elements of the friction system.

Additionally, an oil film 5 formed from a lubricating oil is introduced between the mating element 1 and the friction layer 2, a support 6 made of steel is provided to support the friction lining. At each of the individual friction points 7, a vaporization of the oil film 5 takes place through the heat barrier of the friction layer 2.

The present invention gives an oil retentive and high coefficient of friction by increasing the amount of direct contact friction between the frictional partners. Additionally, to achieve a contact friction at friction points 7 in which the lubricating oil cannot be breached by pressure alone, the invention uses thermal measures to eliminate the oil film (i.e., vaporizes the thin oil film that cannot be removed by pressure alone at the friction points 7 during dynamic motion of the frictional bodies).

Accordingly, the present invention creates contact friction by thermally eliminating the oil film at individual friction points of the surface free from seizing tendency of the friction bodies. Due to the specific progression of the material properties heat capacity and heat conductivity on the side of the coated friction bodies, on the one hand at the surface of the friction layer 2 enough of the heat generated by the friction itself is held to cause boundary friction at points and/or in areas, with vaporization of the otherwise remaining oil film—and on the other hand it is ensured that not too much of the ensuing frictional heat remains in the area of direct acting together of the two friction partners, whereby the occurrence of "hot spots" and/or a seizing between the friction partners is avoided.

In a conventional friction system, a variation of the coefficient of friction may be up to 50% depending on the type of lubricating oil used. In contrast, the variation of the coefficient of friction in the present invention is 5% or less. Additionally, in a conventional friction system, the dynamic coefficient of friction became continuously smaller and the rate of wear likewise greater when friction work is increased to about 3.6 $J/mm^2$ and friction power is increased to about 5 $W/mm^2$. However, with the friction system according to the invention, consisting of a synchronizing ring running at 6 m/s with 4.3 $N/mm^2$ stress in TAI 23, 75W-90 oil for 20,000 cycles, a nearly constant coefficient of friction of 0.12 with a rate of wear of 0.03 mm per contact surface is attained. Indeed, the heat capacity/heat conductivity ratios of the friction lining are essential to these surprisingly outstanding properties of the friction system according to the invention. A stable dynamic coefficient of friction and a very low rate of wear can be ensured by the corresponding ratio of heat generated at the friction points and/or areas to the quantity of heat dissipated into the lower areas of the friction lining and/or the support.

One of the aspects of the invention involves forming the friction lining from at least a pair of mostly homogenous layers. However, a friction lining with more or less continuous modification of the composition and thus of the properties perpendicularly to the surface may also be used. The latter design is preferable when importance is placed on simple production. In this instance, the material properties of the individual layers are relatively easy to coordinate with each other.

Another aspect of the invention provides that the conducting layer 3 with high heat conductivity, preferably made of a copper base alloy, is covered by a thin, elastic friction layer 2, preferably made of tribologically stable material in the form of carbon and oxide ceramics, with an organic binder. This construction of the friction system ensures in a simple manner the providing of the material properties necessary to obtain the effect strived for and/or their required progressions perpendicularly away from the surface of the friction lining.

In the present invention, the ratio of heat capacity of the conducting layer 3 to that of the friction layer 2 is preferably in the 1.35:1 to 14:1 range and the corresponding ratio of the heat conductivity levels is in the 44:1 to 123:1 range. These ranges have yielded on the one hand very favorable coefficients of friction and, on the other hand, low rates of wear.

When the conducting layer 3 is consisted of a porous copper/zinc/tin alloy layer with a heat capacity of at least approximately 3.8 $J/cm^3°K$ and a heat conductivity of at least approximately 1.7 $W/cm°K$, and when the friction layer 2 is consisted of an organically bound carbon/oxide ceramic layer with a heat capacity of at least approximately 0.7 $J/cm3°K$ and a heat conductivity of at least 0.02 $W/cm°K$, the friction system of the present invention yields a very favorable progression of the heat capacity to beat conductivity ratio perpendicularly away from the surface of the friction lining. Additionally, when the ratio of the thickness of the friction layer 2 to that of the conducting layer 3 is in the 1:4 to 1:11 range, which, together with the above-mentioned heat capacity to heat conductivity ratio, produces further improvements with regard to the thermal economy of the friction lining.

To further influence the coefficient of friction of the friction layer 2, the ratio of the carbon proportion to the oxide ceramics proportion can be modified. Thus, for example, when using exclusively carbon in the form of soot and coke in a 33:20 ratio, coefficients of friction of 0.11 are obtained. If this ratio is changed to 33:20:20 soot:coke:quartz, a coefficient of friction of 0.12 ensues. If the ratio is changed to soot:quartz 33:20, coefficients of friction of 0.14 are obtained. These coefficients of friction were attained in TAF 23, 75W-90 transmission oil, with performance characteristic GL 4, or SAF 66, 75W-90 with performance characteristic GL 5 and fully synthetic oils, as well as in pure polyalphaolefin under stresses of up to 3.6 $J/mm^2$ in a brake and with stresses of up to 2.05 $J/mm^2$ in a synchronization.

When using the described friction system according to the invention, considerable advantages result for the design engineer as well as for the user of brakes, clutches, synchronizations and the like. The constant oil-independent coefficient of friction ensures the effect desired by the design engineer on the one hand and, on the other hand, avoids an overloading or a failure under steady load. Such an oil-independent, stress-independent coefficient of friction is particularly significant in synchronization applications, because a decreasing coefficient of friction causes one to fall short of the functional limits of the synchronizing and an increasing coefficient of friction leads to inability to remove the synchronizing ring from the cone and thereby leads to gear damage.

Three examples of the composition of the friction system according to the invention that have been successful in tests are listed below.

EXAMPLE 1

Steel supports 6 of Ø 177.5 mm are sintered with a 86/15 copper/tin alloy in the scatter sintering method with a layer 3 of 0.80 mm and pressed with a film thickness of 0.07 mm by sieve pressing method. The friction layer 2 consists of a nitrile rubber/phenolic resin base with 31 M % soot, 20 M % coke and 5 M % quartz. After drying at 60° C., the phenolic resin is hardened at 200° C. for 20 min. Afterward, the bond of the two layers is jointly grooved and sized. In the end, the friction bond consists of a 0.5 mm thick lower bronze layer 3, a transition layer 4 of 0.02 mm and a 0.05 mm thick upper elastic layer 2.

The heat capacity of the copper/tin scatter-sintered layer 3 was 3.43 $J/cm^3°K$ and its heat conductivity is 1.67 $W/cm°K$. The surface film 2 had a beat conductivity of 0.04 $W/cm°K$ and a heat capacity of 0.79 $J/cm^3°K$. The ratio of heat conductivity of the lower layer to that of the upper layer was thus 39.25. The testing of this friction system with 2.46 $J/mm^2$ friction activity and friction powers of 0.96 $W/mm^2$, 1.74 $W/mm^2$ and 2.67 $W/mm^2$ yielded, in the course of 10,000 shiftings each, a mean coefficient of friction of 0.115 in fully synthetic oil with polyalphaolefin base. The wear of a friction surface was 0.022 mm after 10,000 shiftings.

EXAMPLE 2

Synchronizing ring flat parts for the final diameter of 100 mm are sintered with a 75/20/5 copper/zinc/tin alloy in the scatter-sintering method with a layer thickness 3 of 0.55 mm and pressed with a film 2 of 0.11 mm by sieve pressing method. The composition of the film is a nitrile/phenolic resin base with 33 M % soot, 15 M % coke and 20 M % quartz. The flat part slug is coated on both sides. After drying and hardening, the flat part is drawn into the synchronizing ring including grooving. The scatter-sintered layer had a heat capacity of 2.83 $J/cm^3°K$ and a heat conductivity of 1.55 $W/cm°K$. The surface film had a heat conductivity of 0.03 $W/cm°K$ and a heat capacity of 0.81 $J/cm^3°K$. The ratio of the beat conductivities was thus 94.3. The testing of this double synchronizing ring in an ATF oil with a friction activity of 0.46 $J/mm^2$ and friction power of 0.96 $W/mm^2$ as well as 1.84 $W/mm^2$ showed friction values of 0.13 and after 40,000 shiftings an axial dimension wear of 0.15 mm. This corresponds to a rate of wear of the lining of less 0.02 mm.

EXAMPLE 3

Parts produced as in EXAMPLE 2, but all tested in a pure polyalphaolefin. The coefficient of friction attained a value of 0.120 and the axial dimension wear was 0.11 mm.

While a particular exemplary embodiment of the present invention has been shown and described, it will be apparent to those skilled in the art that various changes and modifications may be made therein without departing from the spirit or scope of the invention. Accordingly, it is intended that the appended claims cover such changes and modifications that come within the spirit and scope of the invention.

What is claimed is:

1. A friction system comprising at least two friction bodies movable relative to, and frictionally engaging with, each other at a friction surface moistened by a lubricating oil to transmit torque, wherein one of said friction bodies has a friction lining with a heat capacity ratio and a heat conductivity ratio which diminish perpendicularly away from said friction surface to cause contact friction and thermal elimination of the lubricating oil at individual friction points of said friction surface, and to dispose seizing tendency of said friction bodies.

2. The friction system according to claim 1, wherein said friction lining comprises at least two homogenous heat conducting and friction layers.

3. The friction system according to claim 2, further comprising:
   a conducting layer made from copper base alloy having high heat conductivity;
   a friction layer made of a tribologically stable material in the form of carbon and oxide ceramics covering said conducting layer; and
   an organic binder inserted between said conducting layer and said friction layer.

4. The friction system according to claim 2, wherein said heat capacity ratio of the conducting layer to the friction layer ranges from 1.35:1 to 14:1, and the corresponding heat conductivity ratio ranges from 44:1 to 123:1.

5. The friction system according to claim 2, wherein the conducting layer comprises of a porous copper/zinc/tin alloy layer with a heat capacity of at least approximately 3–8 $J/cm^{3}°K$ and a heat conductivity of at least approximately 1.7 $W/cm°K$, and wherein
   the friction layer comprises of an organically bound carbon/oxide ceramic layer with a heat capacity of at least approximately 0.7 $J/cm"K$ and a heat conductivity of at least 0.02 $W/cm°K$.

6. The friction system according to claim 2, wherein a thickness ratio of the friction layer to the conducting layer ranges from 1:4 to 1:11.

7. The friction system according to claim 3, wherein a ratio of the carbon proportion to the proportion of the oxide ceramic components is modified to influence the coefficient of friction of the friction layer.

8. The friction system according to claim 3, wherein said heat capacity ratio of the conducting layer to the friction layer ranges from 1.35:1 to 14:1, and the corresponding heat conductivity ratio ranges from 44:1 to 123:1.

9. The friction system according to claim 3, wherein the conducting layer comprises of a porous copper/zinc/tin alloy layer with a heat capacity of at least approximately 3–8 $J/cm^{3}°K$ and a heat conductivity of at least approximately 1.7 $W/cm°K$, and wherein
   the friction layer comprises of an organically bound carbon/oxide ceramic layer with a heat capacity of at least approximately 0.7 $J/cm"K$ and a heat conductivity of at least 0.02 $W/cm°K$.

10. The friction system according to claim 4, wherein the conducting layer comprises of a porous copper/zinc/tin alloy layer with a heat capacity of at least approximately 3–8 $J/cm^{3}°K$ and a heat conductivity of at least approximately 1.7 $W/cm°K$, and wherein
    the friction layer comprises of an organically bound carbon/oxide ceramic layer with a heat capacity of at least approximately 0.7 $J/cm"K$ and a heat conductivity of at least 0.02 $W/cm°K$.

11. The friction system according to claim 3, wherein a thickness ratio of the friction layer to the conducting layer ranges from 1:4 to 1:11.

12. The friction system according to claim 4, wherein a thickness ratio of the friction layer to the conducting layer ranges from 1:4 to 1:11.

13. The friction system according to claim 5, wherein a thickness ratio of the friction layer to the conducting layer ranges from 1:4 to 1:11.

14. The friction system according to claim 6, wherein a thickness ratio of the friction layer to the conducting layer ranges from 1:4 to 1:11.

15. The friction system according to claim 2, wherein a ratio of the carbon proportion to the proportion of the oxide ceramic components is modified to influence the coefficient of friction of the friction layer.

16. The friction system according to claim 3, wherein a ratio of the carbon proportion to the proportion of the oxide ceramic components is modified to influence the coefficient of friction of the friction layer.

17. The friction system according to claim 4, wherein a ratio of the carbon proportion to the proportion of the oxide ceramic components is modified to influence the coefficient of friction of the friction layer.

18. The friction system according to claim 5, wherein a ratio of the carbon proportion to the proportion of the oxide ceramic components is modified to influence the coefficient of friction of the friction layer.

19. The friction system according to claim 6, wherein a ratio of the carbon proportion to the proportion of the oxide ceramic components is modified to influence the coefficient of friction of the friction layer.

* * * * *